US010373312B2

United States Patent
Abedini et al.

(10) Patent No.: US 10,373,312 B2
(45) Date of Patent: Aug. 6, 2019

(54) AUTOMATED SKIN LESION SEGMENTATION USING DEEP SIDE LAYERS

(71) Applicant: International Business Machines Corporation, Armonk, NY (US)

(72) Inventors: Mani Abedini, Melbourne (AU); SeyedBehzad Bozorgtabar, Melbourne (AU); Rajib Chakravorty, Melbourne (AU); Sergey Demyanov, Melbourne (AU); Rahil Garnavi, Melbourne (AU); Zongyuan Ge, Melbourne (AU)

(73) Assignee: International Business Machines Corporation, Armonk, NY (US)

(*) Notice: Subject to any disclaimer, the term of this patent is extended or adjusted under 35 U.S.C. 154(b) by 201 days.

(21) Appl. No.: 15/642,717

(22) Filed: Jul. 6, 2017

(65) Prior Publication Data

US 2018/0130203 A1 May 10, 2018

Related U.S. Application Data

(60) Provisional application No. 62/418,208, filed on Nov. 6, 2016.

(51) Int. Cl.
*G06K 9/00* (2006.01)
*G06T 7/00* (2017.01)

(52) U.S. Cl.
CPC .. *G06T 7/0012* (2013.01); *G06T 2207/20081* (2013.01); *G06T 2207/30088* (2013.01); *G06T 2207/30096* (2013.01)

(58) Field of Classification Search
None
See application file for complete search history.

(56) References Cited

U.S. PATENT DOCUMENTS

| 8,971,609 B2 | 3/2015 | Gareau et al. |
| 2006/0112092 A1 | 5/2006 | Ziou et al. |
| 2016/0133011 A1* | 5/2016 | Nakajima ............... G06T 5/009 |
| | | 382/128 |

FOREIGN PATENT DOCUMENTS

CN 104820842 A 8/2015

OTHER PUBLICATIONS

Peter Mell, "The NIST Definition of Cloud Computing". Special Publication 800-145. Sep. 2011, pp. 1-7.

(Continued)

*Primary Examiner* — Stephen P Coleman
(74) *Attorney, Agent, or Firm* — Grant Johnson; Otterstedt, Wallace & Kammer, LLP

(57) ABSTRACT

A method for computer-aided diagnosis of skin lesions includes obtaining a dermoscopic image, convolving the dermoscopic image in a plurality of convolutional layers, obtaining deconvolved outputs of at least two convolutional layers of the plurality of convolutional layers, obtaining side-output feature maps by applying loss functions to the deconvolved outputs of the at least two convolutional layers, obtaining a first concatenated feature map by concatenating the side-output feature maps with different first weights, obtaining a second concatenated feature map by concatenating the side-output feature maps with different second weights, and producing a final score map by convolving the first and second concatenated feature maps in a final convolutional layer followed by a loss layer. Also disclosed: a computer-readable medium embodying instructions for the method, and an apparatus configured to implement the method.

20 Claims, 9 Drawing Sheets

(56) References Cited

OTHER PUBLICATIONS

John E. Kelly III, "Computing, cognition, and the future of knowing", IBM Corp. Oct. 2015, pp. 1-7.
Noel Codella et al., "Deep learning, sparse coding, and svm for melanoma recognition in dermoscopy images", Proc. Intl. Workshop on Machine Learning in Medical Imaging, Oct. 2015, pp. 118-126.
Rahil Garnavi et al., "Border detection in dermoscopy images using hybrid thresholding on optimized color channels", Computerized Medical Imaging and Graphics, Mar. 2011, v. 35(2), pp. 105-115.
Pablo G. Cavalcanti et al., "Pigmented skin lesion segmentation on macroscopic images", Prco. 25th Intl. Conf. of Image and Vision Computing New Zealand, Nov. 2010, pp. 1-7.
M. Emre Celebi et al., "Border detection in dermoscopy images using statistical region merging", Skin Research and Technology, Aug. 2008, v. 14(3), pp. 1-11.
Bulent Erkol et al., "Automatic lesion boundary detection in dermoscopy images using gradient vector flow snakes", Skin Research and Technology, Feb. 2005, v. 11(1), pp. 1-23.
Behzad Bozorgtabar et al., "Sparse coding based skin lesion segmentation using dynamic rule-based refinement", Intl. Workshop on Machine Learning in Medical Imaging, Oct. 2016, pp. 254-261.
Jonathan Long et al., "Fully convolutional networks for semantic segmentation", arXiv:1411.4038v2, Mar. 2015, pp. 1-10.
Olaf Ronneberger et al., "U-net: Convolutional networks for biomedical image segmentation", arXiv:1505.04597, May 2015, pp. 1-8.
Liang-Chieh Chen et al., "Semantic image segmentation with deep convolutional nets and fully connected crfs", Intl. Conf. on Learning Representations, May 2015, pp. 1-14.
Saining Xie et al., "Holistically-nested edge detection", Proc. IEEE Intl. Conf. on Computer Vision, Dec. 2015, pp. 1395-1403.
Karen Simonyan et al., "Very deep convolutional networks for large-scale image recogntion", arXiv:1409.1556, Apr. 2015, pp. 1-14.
Kevis-Kokitski Maninis et al., "Deep retinal image understanding", arXiv:1609.01103. Sep. 2016, pp. 1-8.
Yuri Boykov et al., "Fast approximate energy minimization via graph cuts", IEEE Trans. on Pattern Analysis and Machine Intelligence, Nov. 2001, v. 23(11), pp. 1222-1239.
David Gutman et al., "Skin lesion analysis toward melanoma detection: A challenge at the international symposium on biomedical imaging (ISBI) 2016, hosted by the international skin imaging collaboration (ISIC)", arXiv:1605.01397, May 2016, pp. 1-5.
Vijay Badrinarayanan et al., "Segnet: a deep convolutional encoder-decoder architecture for image segmentation", arXiv:1511.00561. Oct. 2016. pp. 1-14.
Maciel Zortea et al., "Automatic segmentation of dermoscopic images by iterative classification", J. Biomedical Imaging, May 2011, pp. 1-19.
Li Xu et al. "Deep convolutional neural network for image deconvolution." Advances in Neural Information Processing Systems. Dec. 2014. pp. 1790-1798.
Chen-Yu Lee et al. "Deeply-supervised nets". Artificial Intelligence and Statistics, Feb. 2015. pp. 562-570.
Ujjwal Karn, "An intuitive explanation of convolutional neural networks", The Data Science Blog, https://ujjwalkarn.me/2016/08/11/intuitive-explanation-convnets/, Apr. 2017, pp. 1-17.
Wei Zhang et al. "Computerized detection of clustered microcalcifications in digital mammograms using a shift-Invariant artificial neural network", Med. Phys., Apr. 1994, v. 21(4), pp. 517-524.
Brent P. Hazen et al., "The Clinical Diagnosis of Early Malignant Melanoma: Expansion of the ABCD Criteria to Improve Diagnostic Sensitivity". Dermatology Online Journal, Jun. 1999, v. 5(2), pp. 1-3.

* cited by examiner

```
layer { bottom: 'data' top: 'conv1_1' name: 'conv1_1' type: "Convolution"
param { lr_mult: 1 decay_mult: 1 } param { lr_mult: 2 decay_mult: 0}
convolution_param { engine: CAFFE num_output: 64 pad: 1 kernel_size: 3 } }
layer { bottom: 'conv1_1' top: 'conv1_1' name: 'relu1_1' type: "ReLU" }
layer { bottom: 'conv1_1' top: 'conv1_2' name: 'conv1_2' type: "Convolution"
param { lr_mult: 1 decay_mult: 1 } param { lr_mult: 2 decay_mult: 0}
convolution_param { engine: CAFFE num_output: 64 pad: 1 kernel_size: 3 } }
layer { bottom: 'conv1_2' top: 'conv1_2' name: 'relu1_2' type: "ReLU" }
layer { name: 'pool1' bottom: 'conv1_2' top: 'pool1' type: "Pooling"
pooling_param { pool: MAX kernel_size: 2 stride: 2 } }
layer { name: 'conv2_1' bottom: 'pool1' top: 'conv2_1' type: "Convolution"
param { lr_mult: 1 decay_mult: 1 } param { lr_mult: 2 decay_mult: 0}
convolution_param { engine: CAFFE num_output: 128 pad: 1 kernel_size: 3 } }
layer { bottom: 'conv2_1' top: 'conv2_1' name: 'relu2_1' type: "ReLU" }
layer { bottom: 'conv2_1' top: 'conv2_2' name: 'conv2_2' type: "Convolution"
param { lr_mult: 1 decay_mult: 1 } param { lr_mult: 2 decay_mult: 0}
convolution_param { engine: CAFFE num_output: 128 pad: 1 kernel_size: 3 } }
layer { bottom: 'conv2_2' top: 'conv2_2' name: 'relu2_2' type: "ReLU" }
layer { bottom: 'conv2_2' top: 'pool2' name: 'pool2' type: "Pooling"
pooling_param { pool: MAX kernel_size: 2 stride: 2 } }
layer { bottom: 'pool2' top: 'conv3_1' name: 'conv3_1' type: "Convolution"
param { lr_mult: 1 decay_mult: 1 } param { lr_mult: 2 decay_mult: 0}
convolution_param { engine: CAFFE num_output: 256 pad: 1 kernel_size: 3 } }
layer { bottom: 'conv3_1' top: 'conv3_1' name: 'relu3_1' type: "ReLU" }
layer { bottom: 'conv3_1' top: 'conv3_2' name: 'conv3_2' type: "Convolution"
param { lr_mult: 1 decay_mult: 1 } param { lr_mult: 2 decay_mult: 0}
convolution_param { engine: CAFFE num_output: 256 pad: 1 kernel_size: 3 } }
layer { bottom: 'conv3_2' top: 'conv3_2' name: 'relu3_2' type: "ReLU" }
layer { bottom: 'conv3_2' top: 'conv3_3' name: 'conv3_3' type: "Convolution"
param { lr_mult: 1 decay_mult: 1 } param { lr_mult: 2 decay_mult: 0}
convolution_param { engine: CAFFE num_output: 256 pad: 1 kernel_size: 3 } }
layer { bottom: 'conv3_3' top: 'conv3_3' name: 'relu3_3' type: "ReLU" }
layer { bottom: 'conv3_3' top: 'pool3' name: 'pool3' type: "Pooling"
pooling_param { pool: MAX kernel_size: 2 stride: 2 } }
layer { bottom: 'pool3' top: 'conv4_1' name: 'conv4_1' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv4_1' top: 'conv4_1' name: 'relu4_1' type: "ReLU" }
layer { bottom: 'conv4_1' top: 'conv4_2' name: 'conv4_2' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv4_2' top: 'conv4_2' name: 'relu4_2' type: "ReLU" }
```

*FIG. 4A* layer { bottom: 'conv4_2' top: 'conv4_3' name: 'conv4_3' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv4_3' top: 'conv4_3' name: 'relu4_3' type: "ReLU" }
layer { bottom: 'conv4_3' top: 'pool4' name: 'pool4' type: "Pooling"
pooling_param { pool: MAX kernel_size: 2 stride: 2 } }
layer { bottom: 'pool4' top: 'conv5_1' name: 'conv5_1' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv5_1' top: 'conv5_1' name: 'relu5_1' type: "ReLU" }
layer { bottom: 'conv5_1' top: 'conv5_2' name: 'conv5_2' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv5_2' top: 'conv5_2' name: 'relu5_2' type: "ReLU" }
layer { bottom: 'conv5_2' top: 'conv5_3' name: 'conv5_3' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv5_3' top: 'conv5_3' name: 'relu5_3' type: "ReLU" }
layer { bottom: 'conv5_3' top: 'conv5_4' name: 'conv5_4' type: "Convolution"
param { lr_mult: 1 decay_mult: 1 } param { lr_mult: 2 decay_mult: 0}
convolution_param { engine: CAFFE num_output: 512 pad: 1 kernel_size: 3 } }
layer { bottom: 'conv5_4' top: 'conv5_4' name: 'relu5_4' type: "ReLU" } layer { bottom: 'conv2_2' top: 'conv2_2_side' name: 'conv2_2_side' type: "Convolution"
param { lr_mult: 1 decay_mult: 1 } param { lr_mult: 2 decay_mult: 0}
convolution_param { engine: CAFFE num_output: 16 pad: 1 kernel_size: 3 weight_filler{ type: "gaussian" std: 0.001}} }
layer { bottom: 'conv3_3' top: 'conv3_3_side' name: 'conv3_3_side' type: "Convolution"
param { lr_mult: 1 decay_mult: 1 } param { lr_mult: 2 decay_mult: 0}
convolution_param { engine: CAFFE num_output: 16 pad: 1 kernel_size: 3 weight_filler{ type: "gaussian" std: 0.001}} }
layer { bottom: 'conv4_3' top: 'conv4_3_side' name: 'conv4_3_side' type: "Convolution"
param { lr_mult: 1 decay_mult: 1 } param { lr_mult: 2 decay_mult: 0}
convolution_param { engine: CAFFE num_output: 16 pad: 1 kernel_size: 3 weight_filler{ type: "gaussian" std: 0.001}} }
layer { bottom: 'conv5_3' top: 'conv5_3_side' name: 'conv5_3_side' type: "Convolution"
param { lr_mult: 1 decay_mult: 1 } param { lr_mult: 2 decay_mult: 0}
convolution_param { engine: CAFFE num_output: 16 pad: 1 kernel_size: 3 weight_filler{ type: "gaussian" std: 0.001}} }
layer { bottom: 'conv5_4' top: 'conv5_4_side' name: 'conv5_4_side' type: "Convolution"
param { lr_mult: 1 decay_mult: 1 } param { lr_mult: 2 decay_mult: 0}
convolution_param { engine: CAFFE num_output: 16 pad: 1 kernel_size: 3 weight_filler{ type: "gaussian" std: 0.001}} }

*FIG. 4B*

AUTOMATED SKIN LESION SEGMENTATION USING DEEP SIDE LAYERS

CROSS-REFERENCE TO RELATED APPLICATIONS

This application claims the benefit of U.S. Provisional Patent Application No. 62/418,208 filed on Nov. 6, 2016, the complete disclosure of which is expressly incorporated by reference herein in its entirety for all purposes.

BACKGROUND

The present invention relates to the medical arts, and more specifically, to computer-aided dermoscopy.

Skin lesion segmentation is the first and a key step of computer-aided dermoscopy for skin lesion diagnosis and has significant implications for diagnosis of melanoma. While the task of segmenting a skin lesion is important, it is particularly challenging due to high variability of the lesion shape, presence of artefacts (e.g. hair and fiducial markers) and/or the possibility of a large color distribution across the skin lesion area.

SUMMARY

Principles of the invention provide techniques for automated skin lesion segmentation using deep side layers. In one aspect, an exemplary computer-implemented method includes obtaining a dermoscopic image, convolving the dermoscopic image in a plurality of convolutional layers, obtaining deconvolved outputs of at least two convolutional layers of the plurality of convolutional layers, obtaining side-output feature maps by applying loss functions to the deconvolved outputs of the at least two convolutional layers, obtaining a first concatenated feature map by concatenating the side-output feature maps with different first weights, obtaining a second concatenated feature map by concatenating the side-output feature maps with different second weights, and producing a final score map by convolving the first and second concatenated feature maps in a final convolutional layer followed by a loss layer.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Improved segmentation accuracy for identifying boundaries of lesions in medical images.

Unsupervised segmentation of lesion areas from background areas in dermoscopic images, thereby enabling rapid diagnostics.

An automated system for melanoma skin cancer diagnosis, in which the modules can include: a lesion segmentation module implemented in a plurality of convolutional layers as well as at least two deconvolutional layers producing feature maps from outputs of at least two convolutional layers of the plurality of convolutional layers; a feature generation module implemented in the plurality of convolutional layers and the at least two deconvolutional layers; a classification and risk assessment module operating on the output of the lesion segmentation and feature generation modules; a visualization and similarity retrieval module operating on the output of the lesion segmentation and feature generation modules; a user feedback module operating on the output of the classification and risk assessment module and the visualization and similarity retrieval module; and an active learning module implemented in loss layers associated with the plurality of convolutional layers.

Additional features and advantages of the present invention will become apparent from the following detailed description of illustrative embodiments thereof, which is to be read in connection with the accompanying drawings.

BRIEF DESCRIPTION OF THE DRAWINGS

FIGS. 4A-4B depict a CAFFE script for implementing the neural network model shown in FIG. 3, according to an exemplary embodiment;

DETAILED DESCRIPTION

Figure 1:
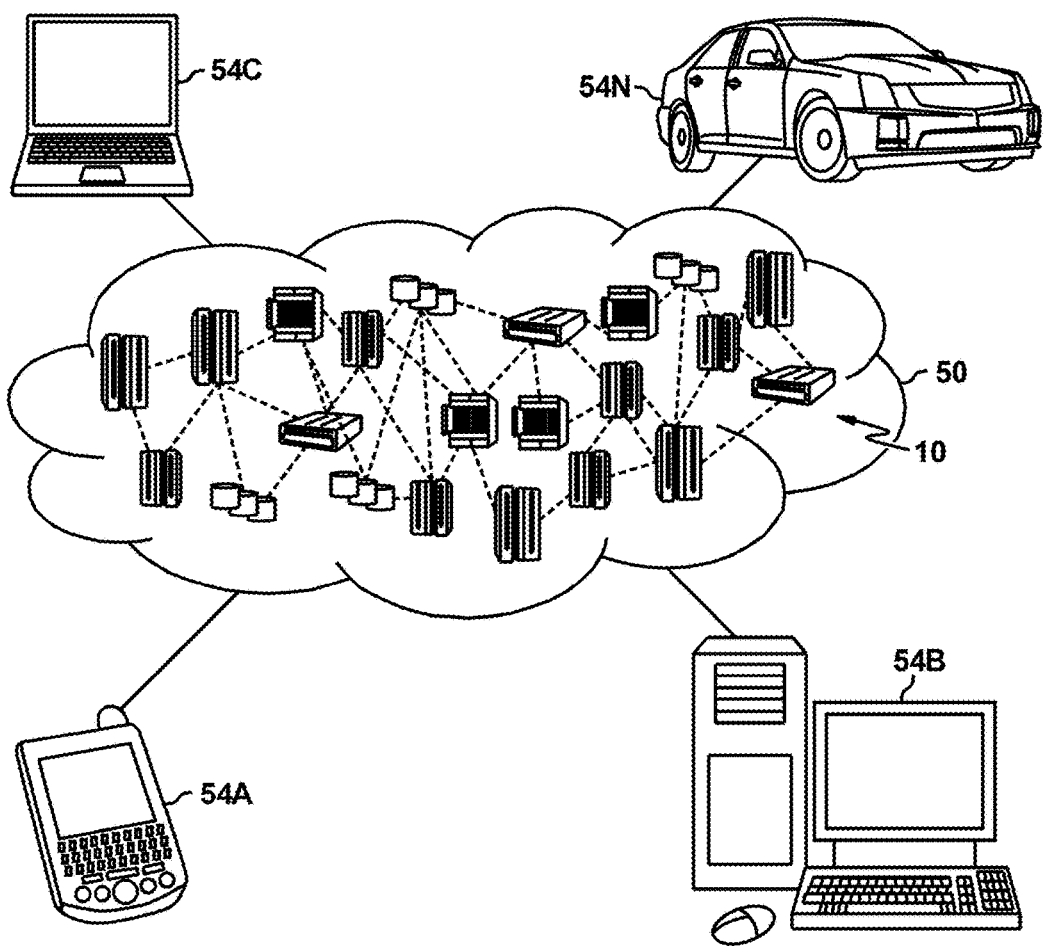
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
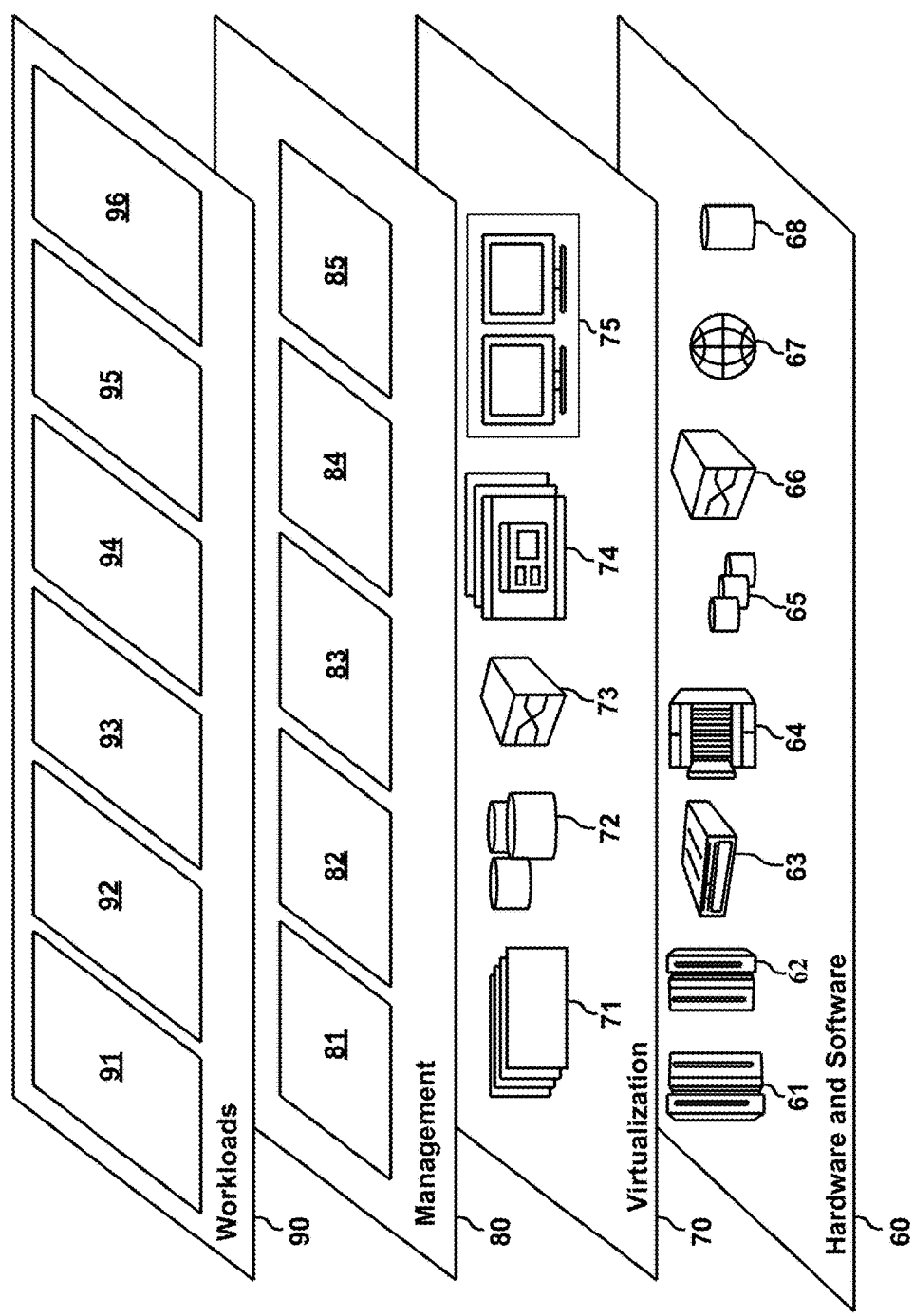
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a computer-aided diagnostics module 96.

Figure 3:
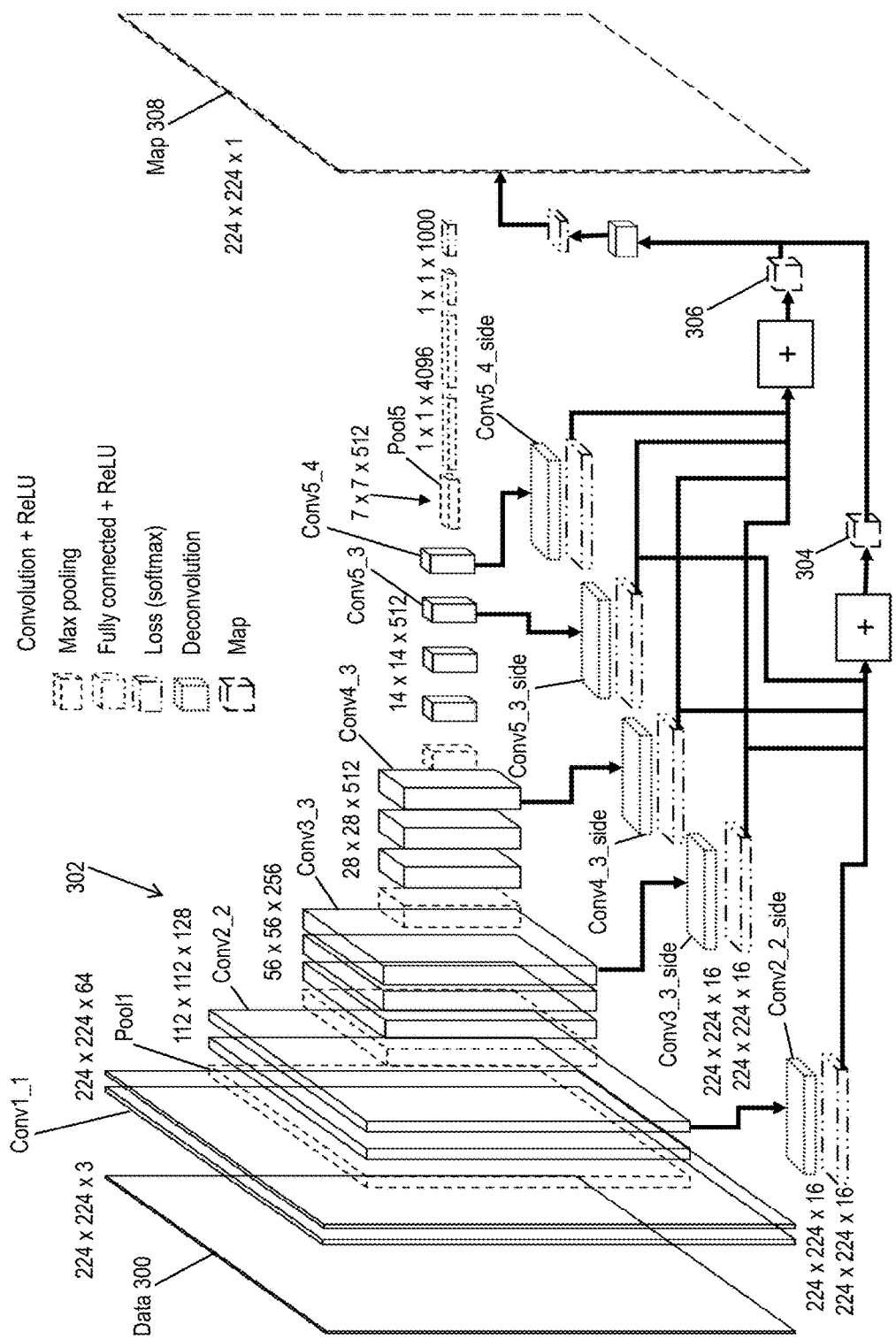
FIG. 3 depicts a block diagram of a VGG-16 neural network model with added side layers, according to an exemplary embodiment.

Referring to FIG. 3, aspects of the invention formulate skin lesion segmentation as an image-to-image regression task, by incorporating a skin lesion segmentation module into the computer-aided diagnostics module 96 as a multilayer convoluted neural network ("CNN") architecture 300 that is based on the VGG-16 visual recognition model (available for download from Visual Geometry Group, Department of Engineering Science, University of Oxford). FIGS. 4A-4B present Caffe code that describes the architecture 300. Caffe is a software engine that implements an artificial intelligence scripting language for defining neural networks, particularly convolutional neural networks. Caffe is developed and maintained by the Berkeley Artificial Intelligence Research Lab at the University of California, Berkeley. An ordinary skilled worker in the field of neural networks can interpret Caffe code.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

A convolutional neural network is a type of feed-forward artificial neural network in which the connectivity pattern between its neurons is inspired by the organization of the animal visual cortex. A CNN is formed by a stack of distinct layers that transform the input volume into an output volume (e.g. holding the class scores) through a differentiable function. A few distinct types of layers are commonly used. These include convolutional layers, pooling layers, rectified linear unit ("ReLU") layers, fully connected layers, and loss layers. Additionally, "deconvolutional" layers may be used, although it is important to understand from the outset that deconvolutional layers do not reverse the work of convolutional layers.

Figure 5:
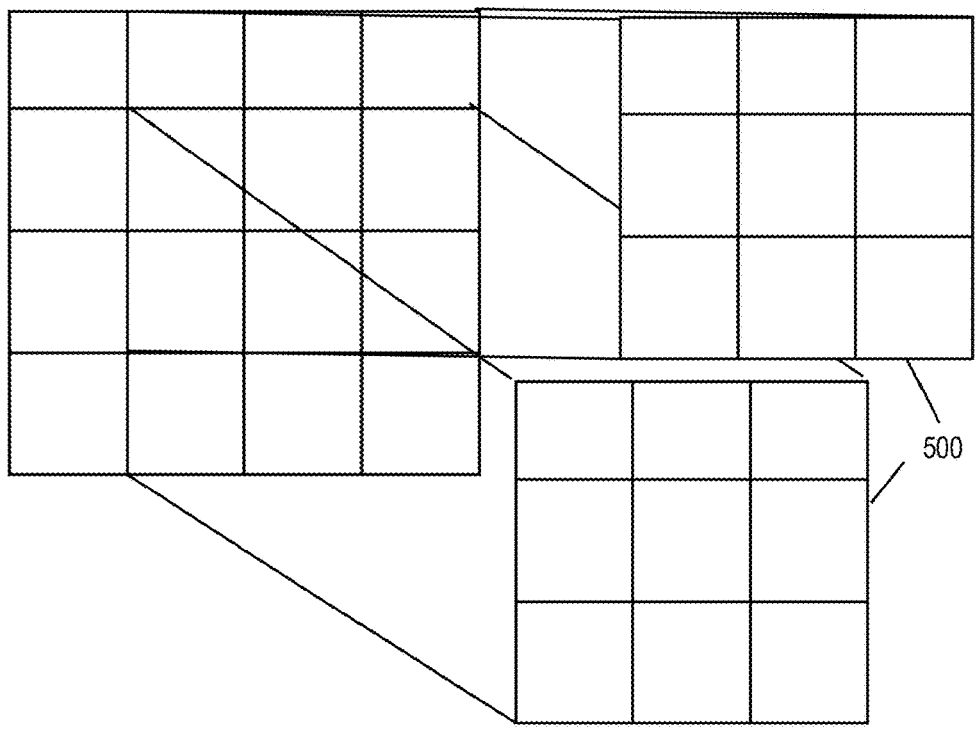
FIG. 5 depicts an exemplary kernel of a neural network convolution layer, according to an exemplary embodiment.

A convolutional layer applies a spatial filter to its input. The filter also is known as a "kernel", and is a matrix of weighting factors. FIG. 5 depicts an exemplary kernel 500 of size 3×3 pixels. A kernel or filter is applied to an input image ("convolved" with the input image) by repeatedly performing matrix dot multiplication of the kernel with corresponding receptive field portions of the input image as the kernel moves across the image. How far the kernel moves between dot multiplications is known as the "stride" of the kernel. For example, if an input image has pixel size 224×224 (as shown in FIG. 3), and if a 2×2 kernel is applied with stride size 1, the resultant output will have pixel size 222×222. To preserve the pixel size of the input image, "zero padding" may be used in which zero values are added around the edges of the input image. For example, if an input image of pixel size 224×224 is zero padded with 1 layer of zeros around its edges, and a 3×3 kernel is applied with stride size 1, the resultant output will have pixel size 224×224 as shown in FIG. 3 ("data" as the input and "conv1_1" as the output).

Each layer of the CNN typically has three dimensions: two pixel size dimensions, i.e. height and width of a two dimensional image, as well as a filter depth dimension, i.e. how many different "feature maps" the layer obtains by applying different kernels to its input. Note that the receptive field of each kernel spans all the feature maps of the input layer.

A pooling layer also applies a spatial filter to its input, however, unlike a typical convolutional layer, the pooling layer downsamples its input to produce an output of lesser spatial dimensions. For example, in FIG. 3 the first pooling layer pool1 receives the second convolutional layer conv1_2 (pixel size 224×224) as its input, and applies a kernel 600 of size 2×2 with a stride of 2 (as defined in FIG. 6). Accordingly, the first pooling layer pool1 produces an output of pixel size 112×112. The first pooling layer pool1 applies 128 different filters to its input, so its output has a total dimension of 112×112×128. One exemplary function that can be used for downsampling is a "max" function that takes the maximum value of the receptive field. Another exemplary function is to take the average value of the receptive field.

A ReLU layer applies a non-linear function, e.g., $f(x)=\max(0,x)$, to the pixels of the preceding layer. The result is to produce an output of the same dimensions as the preceding (input) layer, but with more non-linearity. The increased non-linearity enhances the speed of machine learning.

A fully connected layer has each pixel connected to all the pixels of the preceding layer, so that its receptive field includes the entire input data. In practice, this means that a fully connected layer has pixel size 1×1. Typically, a fully connected layer is "deep" in terms of the number of different kernels or feature maps. FIG. 3 depicts two fully connected layers of size 1×1×4096, which are used for training the filter weights of the convolutional layers. However, in one or more embodiments of the invention the convolutional layer weights are pretrained, thus, the fully connected layer do not need to be implemented.

A loss layer specifies how the network training penalizes a deviation between the predicted and true labels, and is normally the last layer in the network. Because the convolutional layer weights are pretrained in one or more embodiments of the invention, the softmax loss layer size 1×1×1000 does not need to be implemented.

One or more embodiments utilize five blocks of convolutional layers conv2_2, conv3_3, conv4_3, conv5_3, and conv5_4 from the VGG-16 network, between pooling layers pool1, pool5. The first convolutional layer conv2_2 has 112×112 pixels and 128 kernels; the second convolutional layer conv3_3 has 56×56 pixels and 256 kernels; the third convolutional layer conv4_3 has 28×28 pixels and 512 kernels; the fourth convolutional layer conv5_3 has 14×14 pixels and 512 kernels; the fifth convolutional layer conv5_4 has 14×14 pixels and 512 kernels. All of the convolutional layer kernels are size 3×3 pixels, stride 1. The pooling layer pool1 has 112×112 pixels and 128 kernels size 2×2 with stride 2; the pooling layer pool5 has 7×7 pixels and 512 kernels of size 2×2 with stride 2. The pooling layers preferably implement max pooling, although in one or more embodiments average pooling can be used.

One or more embodiments add side-output layers to the convolutional layers mentioned above, in order to take advantage of multi-scale convolutional features. Each side-output layer includes subordinate layers (a de-convolutional layer and a loss layer, e.g., a softmax layer). The deconvolutional layer of each side-output layer generates feature maps from the image that is input to that side-output layer (i.e., from the features of the multi-channel image that was generated by the convolutional layer). For example, the deconvolutional layer of side-output layer conv2_2_side produces 16 feature maps of spatial dimension 224×224 pixels based on the 128 feature maps of layer conv2_2, whereas conv4_3_side produces 16 feature maps of spatial dimension 224×224 pixels based on the 512 feature maps of layer conv4_3. The de-convolutional layers upsample the different size feature maps to match the spatial dimensions of the original image data, 224×224 pixels. A final convolutional layer map, size 224×224×1, linearly combines the upsampled feature maps to produce a grayscale lesion feature map 306. The softmax loss layers compute the final objective of the lesion border map 304 from the upsampled feature maps.

In one or more embodiments, the final layer directly notifies each side-output layer about the final objective of segmenting the skin lesion, rather than relying on the final layer to back-propagate the final objective through each preceding convolutional layer in the VGG-16 architecture.

One or more embodiments of the invention use varying feature maps with varying resolutions. Early layers of the convolutional neural network have high spatial resolution while deeper layers return high semantic features. Thus, proceeding deeper in the network, the convolutional layers are associated with larger receptive fields in the input image. Small kernels have a small receptive field, so at the earlier layers the kernels can provide information only regarding local relations, but at each deeper layer of the network, the receptive field of each neuron with respect to the earlier layer becomes larger and collects information from a larger spatial context at the input. Thus, deep layers can provide features with global semantic meaning, while using only small kernels.

Figure 6:
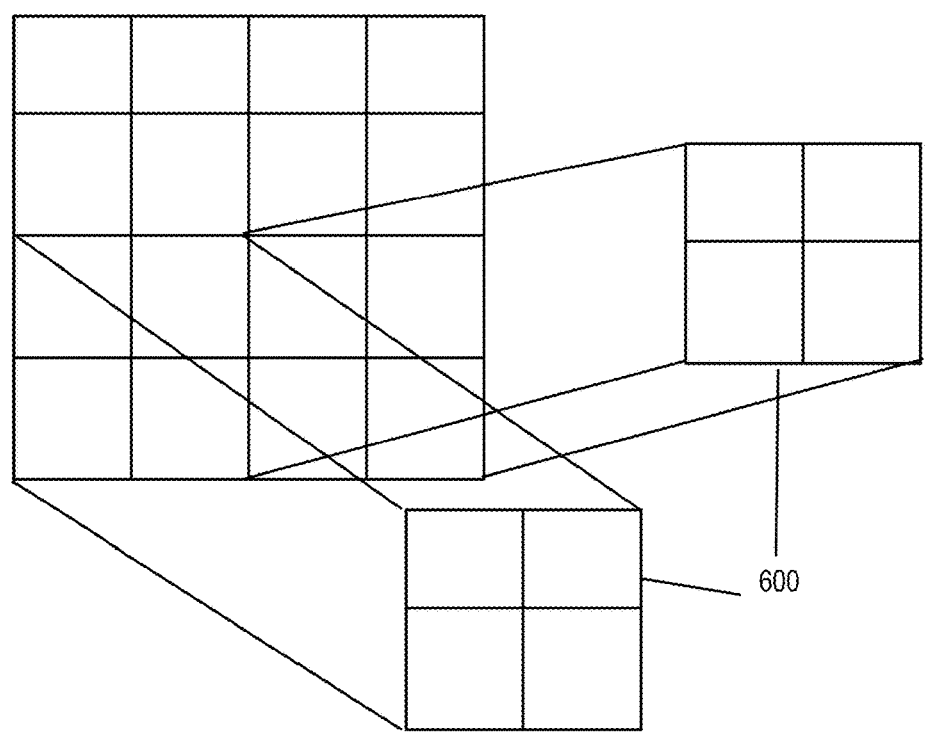
FIG. 6 depicts an exemplary kernel of a neural network pooling layer, according to an exemplary embodiment.

Advantageously, each side-output layer produces a feature map. The early layers contribute to develop the lesion border map, whereas the deeper layers provide more semantic information and contribute to the global lesion map. The global map models the global lesion's shape while the lesion border map represents the lesion boundary details such as the lesion fuzzy boundary. For example, layers conv2_2, conv3_3, conv4_3, and conv5_3 contribute to the lesion border map 304, whereas layers conv3_3, conv4_3, conv5_3, and conv5_4 contribute to the lesion feature map 306. The pixels of the lesion border map provide useful information about lesion shape as input to another computer vision process, as shown in FIG. 6.

Additionally, one or more embodiments assign different weights to the output of different side-output layers to fuse the corresponding score maps. One or more embodiments implement a class-balanced cross-entropy loss function, which relates to the layers' parameters, as follows:

$$\mathcal{L}(W) = -\beta \Sigma_{j \in Y_+} \log \Pr(y_j=1|X;W) - (1-\beta) \Sigma_{j \in Y_-} \log \Pr(y_j=0|X;W) \quad (1)$$

where $\beta$ is the ratio of negative samples over all samples, $Y_+$ is the ground truth for positive samples, $Y_-$ is the ground truth for negative samples, $\Pr(y_j=1|X;W) = \sigma(a_j^{(m)})$ is the probability score of being lesion area rather than background skin applied on the activation value, and $a_j^{(m)}$ is the activation value of pixel j using the sigmoid function.

The volumes of the features obtained at each of the side-output layers then are concatenated with the different weights, which are found empirically and are the same for all three scales (0.5, 1.0 and 1.5). The concatenated feature volumes are passed to the last convolutional layer followed by the softmax layer to produce the final score map. The class-balanced cross-entropy loss function is used at the end for the segmentation problem.

Figure 7:
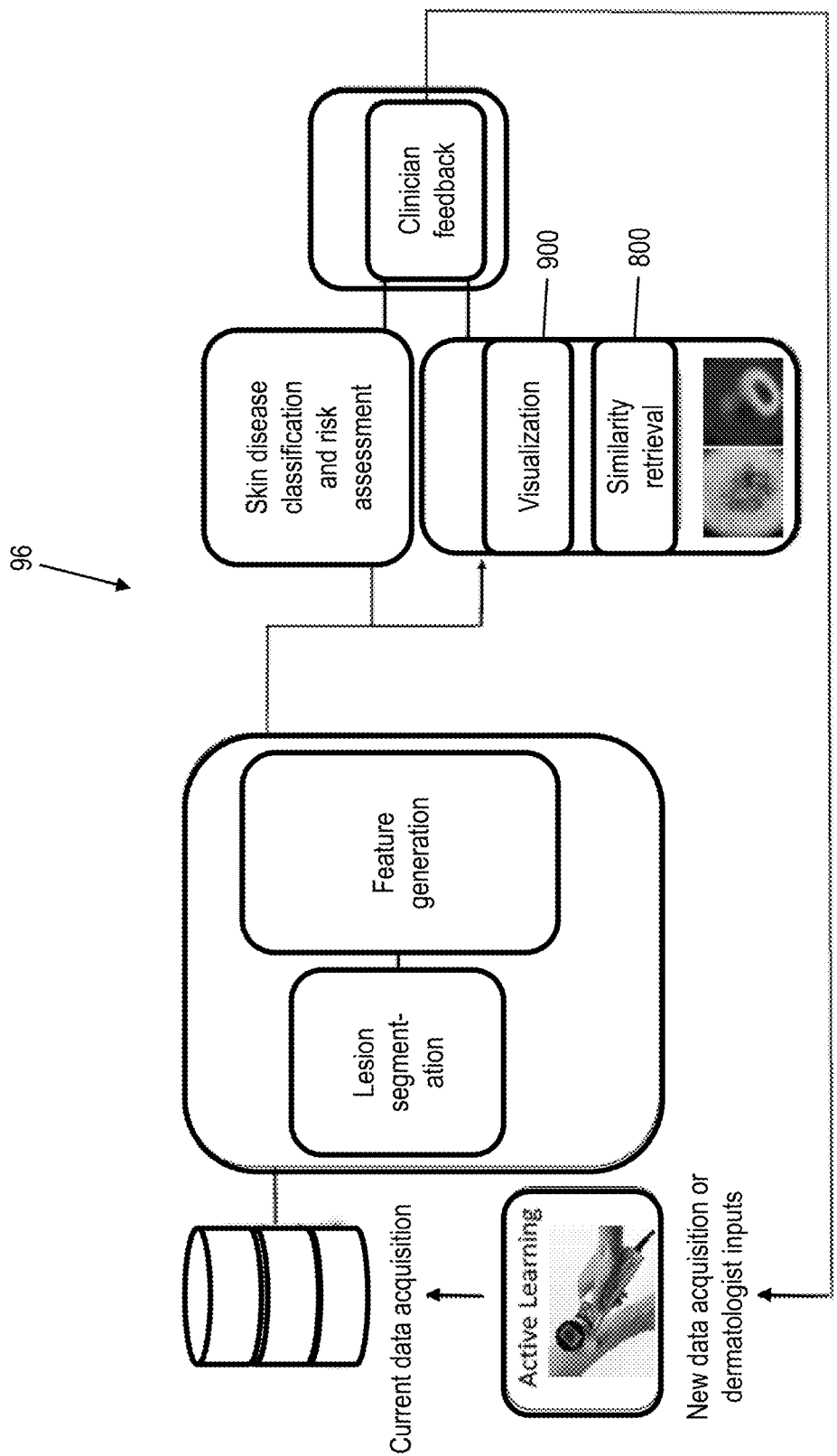
FIG. 7 depicts a computer-aided diagnostic module in which the neural network model of FIG. 3 is used according to an exemplary embodiment.
Figure 8:
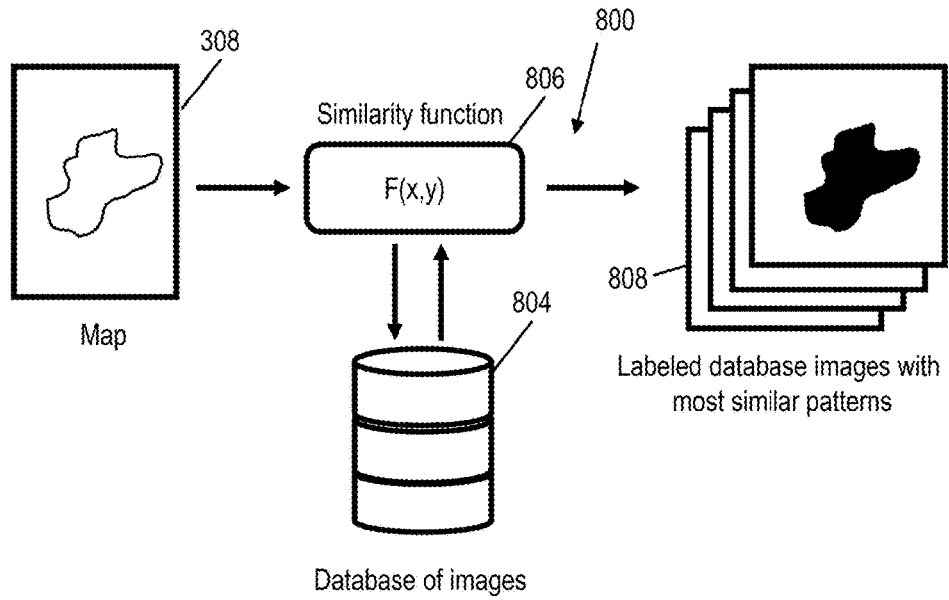
FIG. 8 depicts a similarity retrieval module of the computer-aided diagnostic module, according to an exemplary embodiment.

In addition to the CNN 300, in one or more embodiments the segmentation module 300 passes the map 308 to a similarity retrieval module 800, shown in FIGS. 7 and 8. The similarity retrieval module 800 makes use of a similarity function 806 that can identify images of lesions from a database 804 that have local patterns close to the map 308. Before entering the similarity function 806, the map 308 is normalized to be the standard resolution and illumination. Disease patterns in the map 308, segmented by the CNN 300, are circled by region boundaries. The similarity function 806 extracts mages with the most similar patterns from the database. At step 808, the similarity retrieval module 800 displays the extracted images and their diagnoses to a user, with the similarity regions and patterns highlighted for further comparison.

Figure 9:
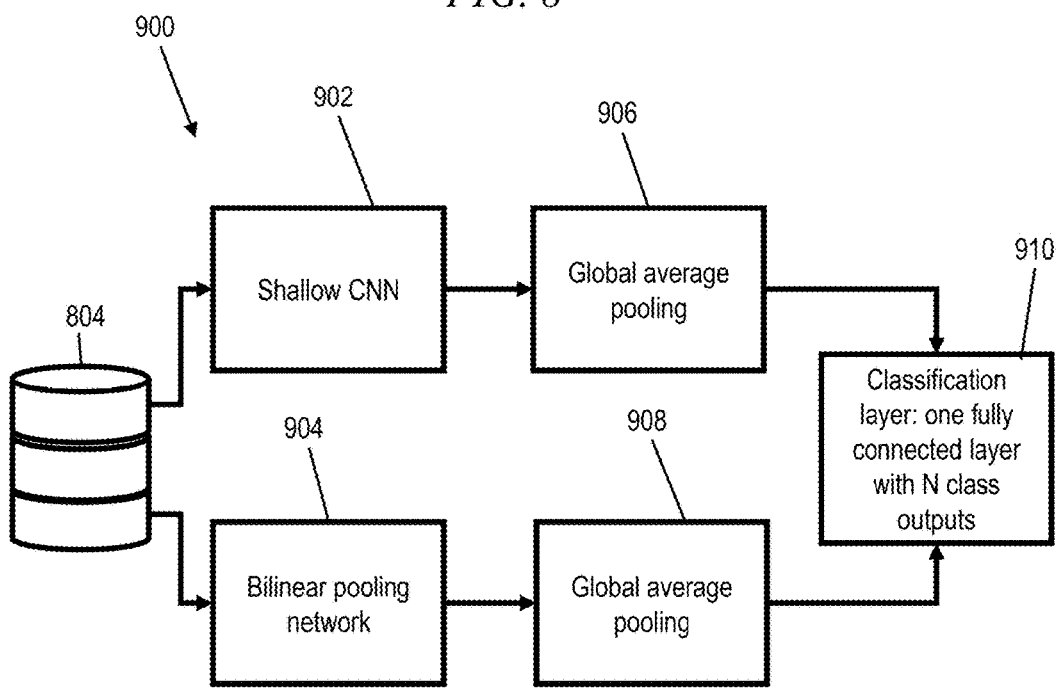
FIG. 9 depicts a skin disease pattern retrieval module of the computer-aided diagnostic module, according to an exemplary embodiment.

The similarity function 806 of the similarity retrieval module 800 makes use of a skin disease pattern discovery module 900, shown in FIGS. 7 and 9. The skin disease pattern recovery module 900 fuses two different types of neural networks to discover new patterns from the datasets. A shallow network 902 and a bilinear pooling network 904 are used to learn different features. Global average pooling layers 906, 908 are applied to the outputs of both feature learning components, so that discovered patterns are generated by using bilinear pooling with global average pooling in a novel way. Then a classification layer 910, which is a fully connected layer with N class outputs, processes the discovered patterns to identify a corresponding classification of skin disease. Thus, the similarity measures of the similarity function 806 are not based on final outcome only, but also reference local patterns within the map 308. In other words, the similarity can be calculated not only on the presence/absence of certain local patterns but how these contributed to the final outcome (the rank).

Given the discussion thus far, it will be appreciated that, in general terms, an exemplary computer-implemented method, according to an aspect of the invention, includes obtaining a dermoscopic image 300; convolving the dermoscopic image in a plurality of convolutional layers 302; obtaining deconvolved outputs of at least two convolutional layers (e.g., conv2_2, conv3_3) of the plurality of convolutional layers; obtaining side-output feature maps by applying loss functions to the deconvolved outputs (e.g., conv2_2_side, conv3_3_side) of the at least two convolutional layers; obtaining a first concatenated feature map 304 by concatenating the side-output feature maps with different first weights; obtaining a second concatenated feature map 306 by concatenating the side-output feature maps with different second weights; and producing a final score map 308 by convolving the first and second concatenated feature maps in a final convolutional layer followed by a loss layer. In one or more embodiments, the at least two convolutional layers include first, second, third, fourth, and fifth convolutional layers (e.g., conv2_2, conv3_3, conv4_3, conv5_3, conv5_4). In further embodiments, the exemplary method includes obtaining a training dermoscopic image and a training final score map; convolving the training dermoscopic image in the plurality of convolutional layers; deconvolving the outputs of the at least two convolutional layers of the plurality of convolutional layers; obtaining trial side-output feature maps by applying loss functions to the deconvolved outputs of the at least two convolutional layers; obtaining a trial concatenated feature map by concatenating the trial side-output feature maps with different weights; convolving the trial concatenated feature map in the final convolutional layer followed by the loss layer to produce a trial final score map; assessing variances of the trial final score map from the training final score map; adjusting filters of the plurality of convolutional layers in response to the variances; and repeating the preceding steps until the variances are less than a threshold variance vector. Particular embodiments include adjusting deconvolution filters in response to the variances. According to certain embodiments, the plurality of convolutional layers comprise a VGG-16 neural network. For example, the at least two convolutional layers include conv2_2, conv3_3, conv4_3, and conv5_3 layers of the VGG-16 neural network. Additionally, the plurality of convolutional layers may include a conv5_4 layer of dimensions 14×14×512, in addition to the layers of the VGG-16 neural network, and the conv5_4 layer is one of the at least two convolutional layers.

Figure 10:
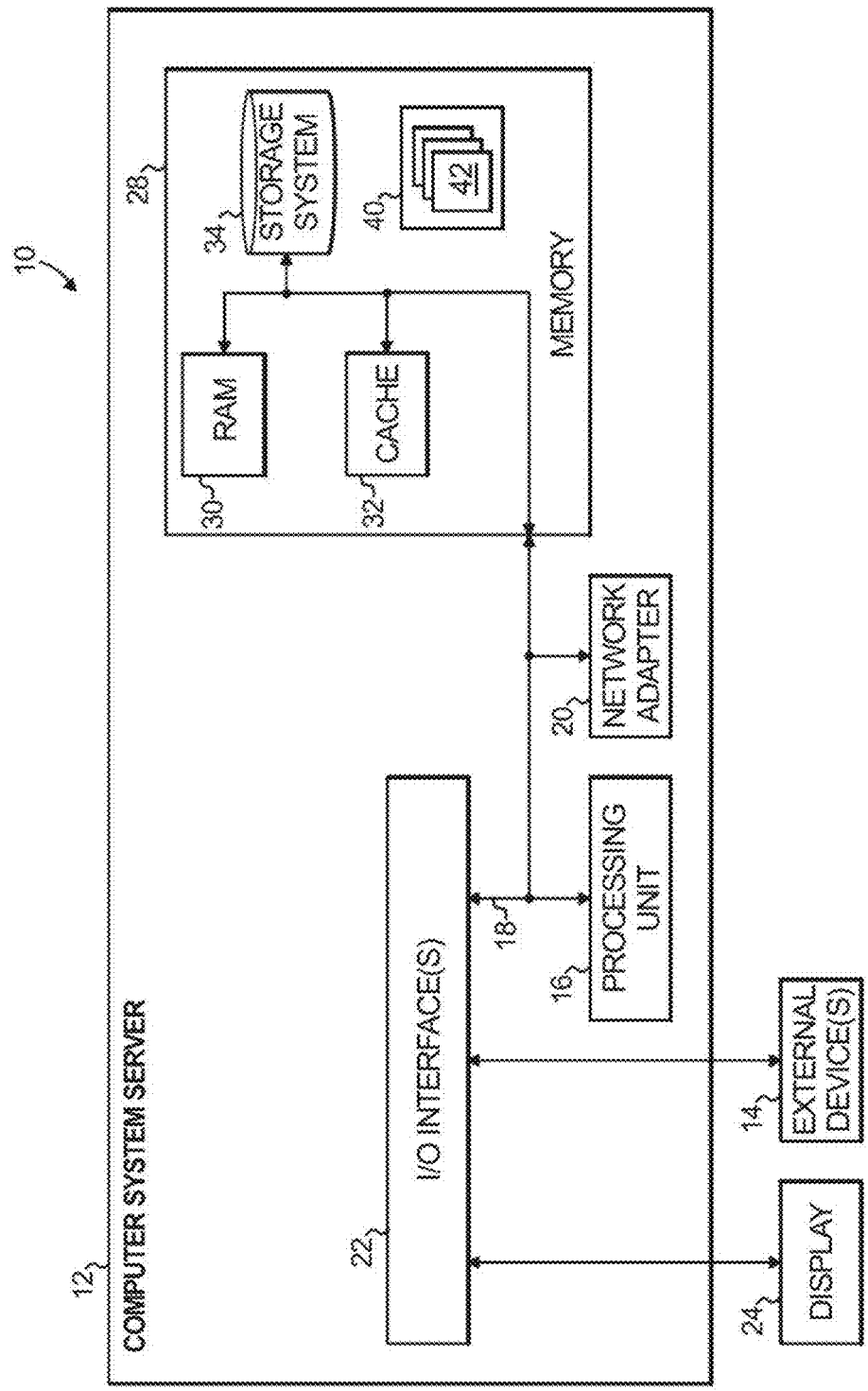
FIG. 10 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a dermoscopic image;
    convolving the dermoscopic image in a plurality of convolutional layers;
    obtaining deconvolved outputs of at least two convolutional layers of the plurality of convolutional layers;
    obtaining side-output feature maps by applying loss functions to the deconvolved outputs of the at least two convolutional layers;

obtaining a first concatenated feature map by concatenating the side-output feature maps with different first weights;

obtaining a second concatenated feature map by concatenating the side-output feature maps with different second weights; and producing a final score map by convolving the first and second concatenated feature maps in a final convolutional layer followed by a final loss layer.

2. The method of claim 1 wherein the final loss layer directly notifies each side-output layer about the final objective of segmenting the skin lesion.

3. The method of claim 1 further comprising:
obtaining a training dermoscopic image and a training final score map;
convolving the training dermoscopic image in the plurality of convolutional layers;
deconvolving the outputs of the at least two convolutional layers of the plurality of convolutional layers;
obtaining trial side-output feature maps by applying loss functions to the deconvolved outputs of the at least two convolutional layers;
obtaining a trial concatenated feature map by concatenating the trial side-output feature maps with different weights;
convolving the trial concatenated feature map in the final convolutional layer followed by the final loss layer to produce a trial final score map;
assessing variances of the trial final score map from the training final score map;
adjusting filters of the plurality of convolutional layers in response to the variances; and
repeating the preceding steps until the variances are less than a threshold variance vector.

4. The method of claim 3 further comprising adjusting deconvolution filters in response to the variances.

5. The method of claim 1 wherein the plurality of convolutional layers comprise a VGG-16 neural network.

6. The method of claim 5 wherein the at least two convolutional layers include conv2_2, conv3_3, conv4_3, and conv5_3 layers of the VGG-16 neural network.

7. The method of claim 5 wherein the plurality of convolutional layers comprise a conv5_4 layer of dimensions 14×14×512, in addition to the layers of the VGG-16 neural network, and the conv5_4 layer is one of the at least two convolutional layers.

8. A non-transitory computer readable medium embodying computer executable instructions which when executed by a computer cause the computer to perform the method of:
obtaining a dermoscopic image;
convolving the dermoscopic image in a plurality of convolutional layers;
obtaining deconvolved outputs of at least two convolutional layers of the plurality of convolutional layers;
obtaining side-output feature maps by applying loss functions to the deconvolved outputs of the at least two convolutional layers;
obtaining a first concatenated feature map by concatenating the side-output feature maps with different first weights;
obtaining a second concatenated feature map by concatenating the side-output feature maps with different second weights; and
producing a final score map by convolving the first and second concatenated feature maps in a final convolutional layer followed by a loss layer.

9. The medium of claim 8 wherein the final loss layer directly notifies each side-output layer about the final objective of segmenting the skin lesion.

10. The medium of claim 8, the method further comprising:
obtaining a training dermoscopic image and a training final score map;
convolving the training dermoscopic image in the plurality of convolutional layers;
deconvolving the outputs of the at least two convolutional layers of the plurality of convolutional layers;
obtaining trial side-output feature maps by applying loss functions to the deconvolved outputs of the at least two convolutional layers;
obtaining a trial concatenated feature map by concatenating the trial side-output feature maps with different weights;
convolving the trial concatenated feature map in the final convolutional layer followed by the loss layer to produce a trial final score map;
assessing variances of the trial final score map from the training final score map;
adjusting filters of the plurality of convolutional layers in response to the variances; and
repeating the preceding steps until the variances are less than a threshold variance vector.

11. The medium of claim 10, the method further comprising adjusting deconvolution filters in response to the variances.

12. The medium of claim 8 wherein the plurality of convolutional layers comprise a VGG-16 neural network.

13. The medium of claim 12 wherein the at least two convolutional layers include conv2_2, conv3_3, conv4_3, and conv5_3 layers of the VGG-16 neural network.

14. The medium of claim 12 wherein the plurality of convolutional layers comprise a conv5_4 layer of dimensions 14×14×512, in addition to the layers of the VGG-16 neural network, and the conv5_4 layer is one of the at least two convolutional layers.

15. An apparatus comprising:
a memory in which computer executable instructions are stored; and
at least one processor, coupled to said memory, and operative by the computer executable instructions to perform a method comprising:
obtaining a dermoscopic image;
convolving the dermoscopic image in a plurality of convolutional layers;
obtaining deconvolved outputs of at least two convolutional layers of the plurality of convolutional layers;
obtaining side-output feature maps by applying loss functions to the deconvolved outputs of the at least two convolutional layers;
obtaining a first concatenated feature map by concatenating the side-output feature maps with different first weights;
obtaining a second concatenated feature map by concatenating the side-output feature maps with different second weights; and
producing a final score map by convolving the first and second concatenated feature maps in a final convolutional layer followed by a loss layer.

16. The apparatus of claim 15, the method further comprising:
obtaining a training dermoscopic image and a training final score map;

convolving the training dermoscopic image in the plurality of convolutional layers;
deconvolving the outputs of the at least two convolutional layers of the plurality of convolutional layers;
obtaining trial side-output feature maps by applying loss functions to the deconvolved outputs of the at least two convolutional layers;
obtaining a trial concatenated feature map by concatenating the trial side-output feature maps with different weights;
convolving the trial concatenated feature map in the final convolutional layer followed by the loss layer to produce a trial final score map;
assessing variances of the trial final score map from the training final score map;
adjusting filters of the plurality of convolutional layers in response to the variances; and
repeating the preceding steps until the variances are less than a threshold variance vector.

17. The apparatus of claim 16, the method further comprising adjusting deconvolution filters in response to the variances.

18. The apparatus of claim 15 wherein the plurality of convolutional layers comprise a VGG-16 neural network.

19. The apparatus of claim 18 wherein the at least two convolutional layers include conv2_2, conv3_3, conv4_3, and conv5_3 layers of the VGG-16 neural network.

20. The apparatus of claim 18 wherein the plurality of convolutional layers comprise a conv5_4 layer of dimensions 14×14×512, in addition to the layers of the VGG-16 neural network, and the conv5_4 layer is one of the at least two convolutional layers.

* * * * *